Figure 3:
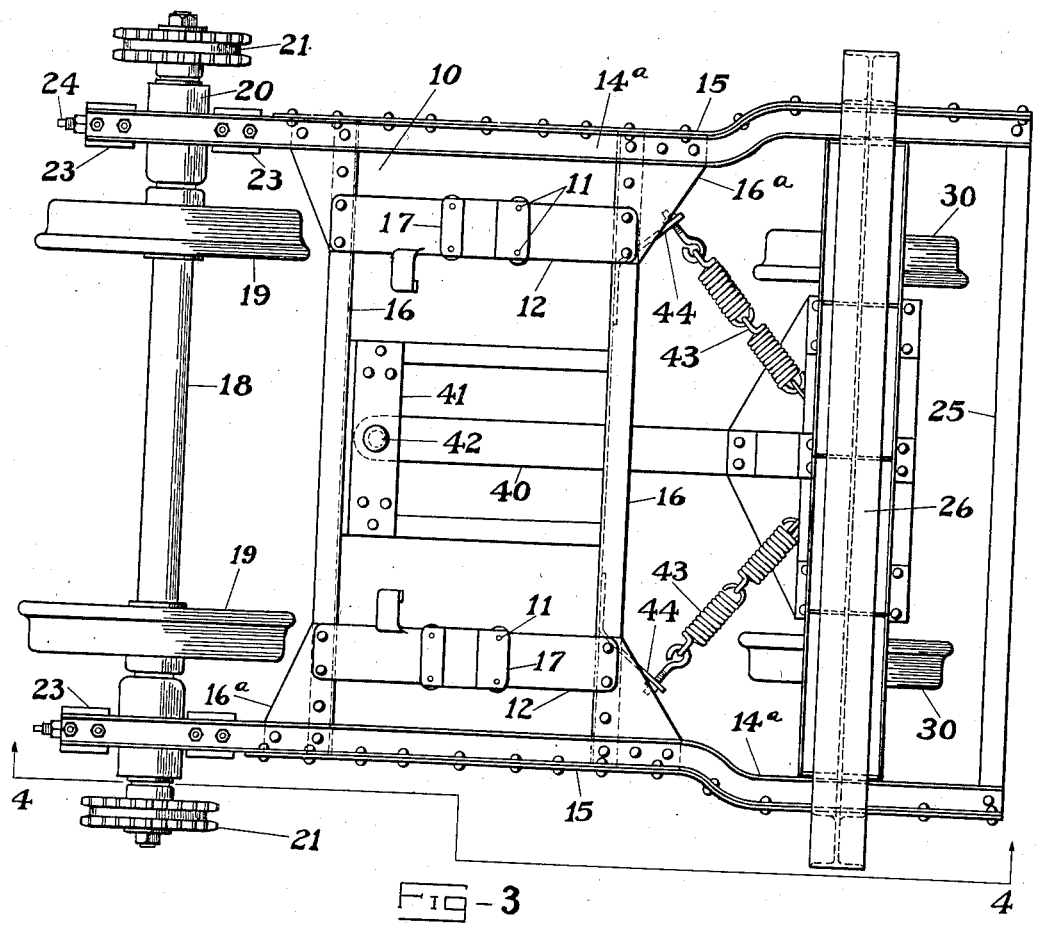

April 11, 1939.  A. C. SCHMOHL  2,154,140
CAR CONSTRUCTION
Filed Aug. 14, 1936  3 Sheets-Sheet 1
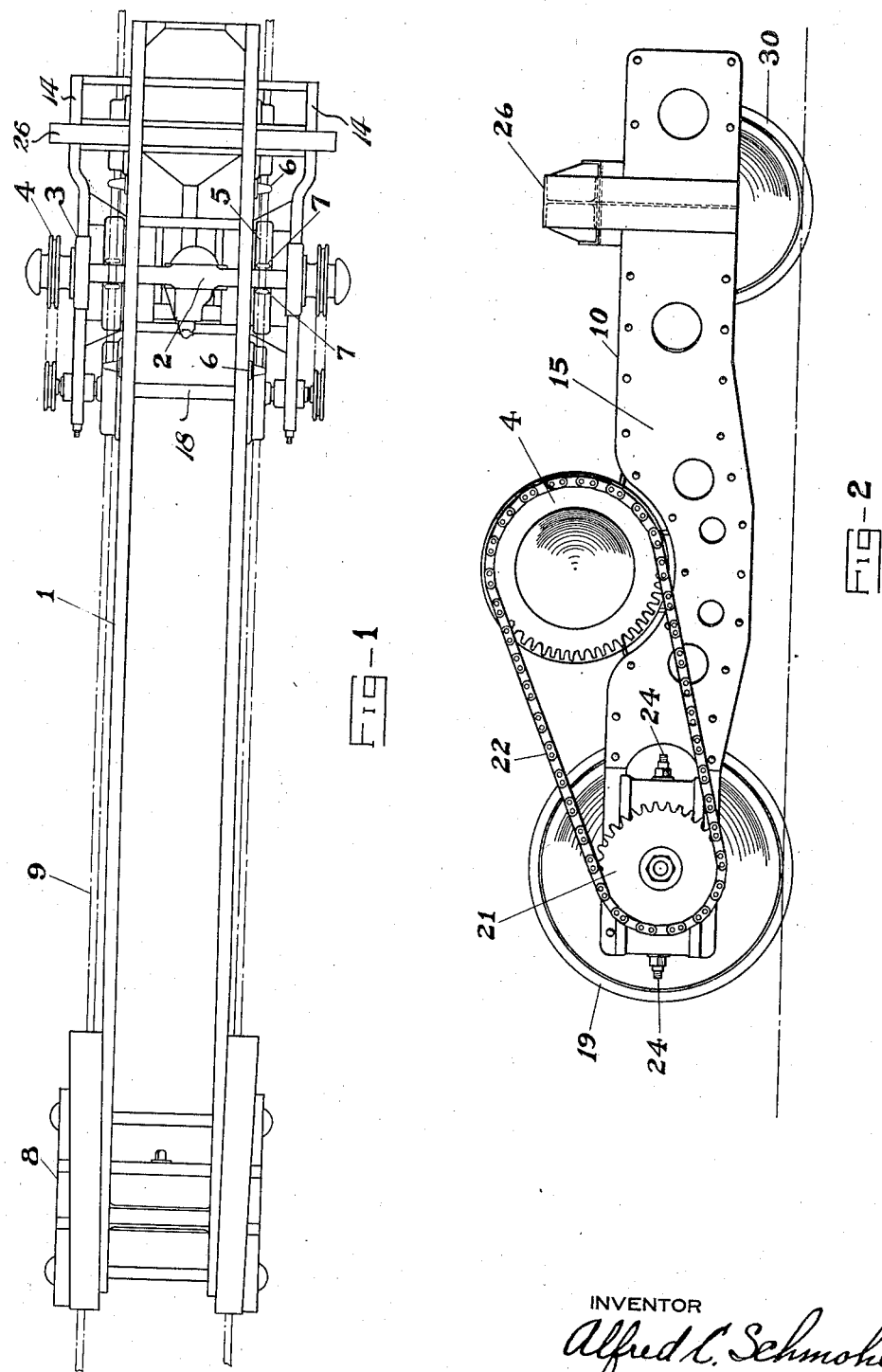
INVENTOR
Alfred C. Schmohl
BY
ATTORNEY April 11, 1939.  A. C. SCHMOHL  2,154,140
CAR CONSTRUCTION
Filed Aug. 14, 1936  3 Sheets-Sheet 2

INVENTOR
Alfred C. Schmohl
BY
ATTORNEY

April 11, 1939.  A. C. SCHMOHL  2,154,140

CAR CONSTRUCTION

Filed Aug. 14, 1936  3 Sheets-Sheet 3

INVENTOR
Alfred C. Schmohl.
BY
ATTORNEY

Patented Apr. 11, 1939

2,154,140

UNITED STATES PATENT OFFICE 2,154,140

CAR CONSTRUCTION

Alfred C. Schmohl, Beaver Falls, Pa., assignor, by mesne assignments, to Pressed Steel Car Company, Inc., Pittsburgh, Pa., a corporation of Pennsylvania Application August 14, 1936, Serial No. 96,004

4 Claims. (Cl. 105—159)

The invention pertains generally to car construction and in particular to the conversion of a motor truck chassis designed for operation on a highway into a rail car. The motor truck chassis is of a standard design having a power plant at the front end, usually in the form of a gasoline motor, driving wheels at the rear end thereof, and one steering axle having a wheel at each end thereof at the front of the chassis. These motor truck chassis are frequently converted into rail cars for use on narrow gauge tracks varying from a gauge of 30" upward in contrast to the usual 4' 8½" track gauge standard on American railways. The usual practice is to substitute a four-wheel truck beneath the power plant at the front end of the chassis in place of the usual steering axle, a four-wheel truck beneath the rear end of the chassis and connecting the driving axle of the chassis to one of the rear truck axles to propel the rail car. These narrow gauge tracks have curves built upon a very short radius, frequently of 150 feet or less, and by reason of connecting the rear truck to the driving axles of the chassis, the rear truck cannot be pivotally connected to the chassis so that some provision must be made for lateral movement of the rear of the chassis whilst traversing these short radii curves of the track.

In the past, different mechanisms have been provided to accommodate the necessary lateral movement of the rear of the chassis relative to the track in cases where a non-swiveling truck has been disposed beneath the rear end of the vehicle. In some cases the axle has been permitted to shift laterally of the truck but such a method is objectionable where the axles are driven as in the present invention. Another method has been to eliminate the flange on the wheels of the rear truck and provide a wide tread so that the tread of the wheel could slide laterally of the rail whilst traversing curves. Such a method is objectionable because of excessive wear of the wheel treads and track, and in cases of curves having short radii the width of flange required to provide the necessary lateral movement of the truck makes this method impractical and produces an unsightly wheel.

Another objectionable feature of the above described means for accommodating lateral movement between the vehicle and track was the lack of means for returning the vehicle wheels to a normal position whilst traversing the straight portions of the track. It is an object of the present invention to provide means for returning the wheels to a normal position whilst the vehicle is traversing straight portions of the track.

Another object of the invention is to provide a flanged wheel rear truck for a vehicle of the character described having one driven axle and a following axle pivoted on the truck independently of the chassis.

Another object of the invention is to provide a pivotal connection and support for the following axle upon the truck frame so that the frame may remain rigid with the chassis and the following axle move independently of the chassis and relative to the truck.

Figure 4:
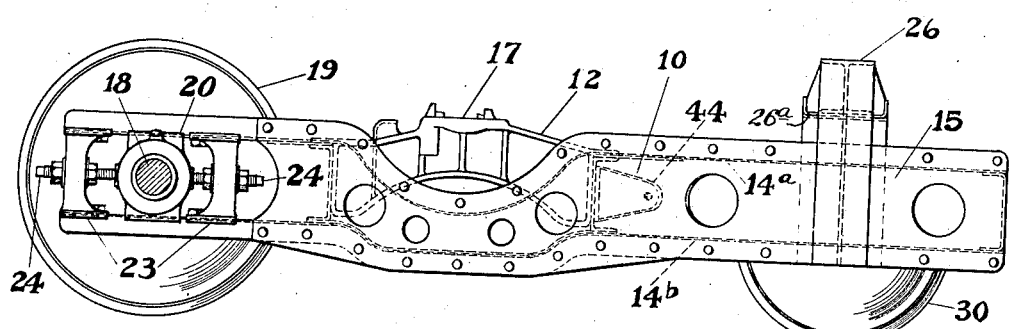
Figure 5:
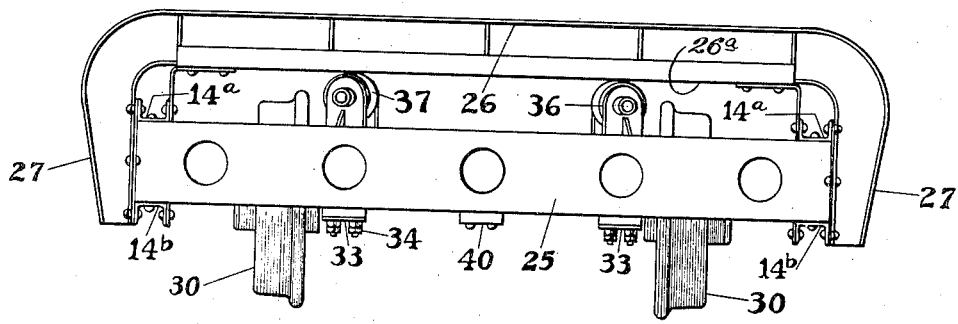
Figure 6:
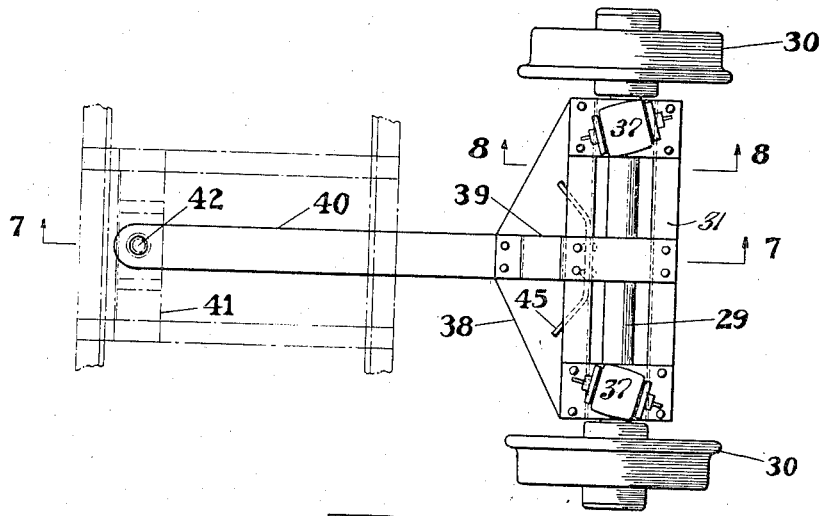
Figure 7:
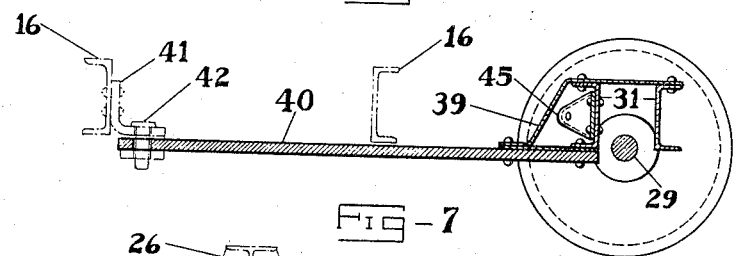
Figure 8:
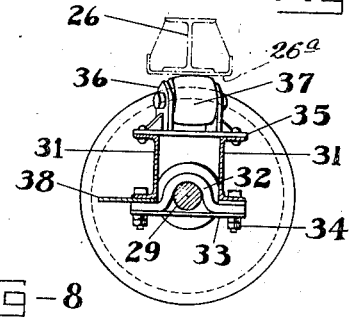

In the drawings forming part of this specification, Fig. 1 shows in plan view a standard motor vehicle chassis having a truck of conventional design beneath the front end of the chassis and a truck embodying the present invention rigidly connected to the rear end of the chassis; Fig. 2 shows in elevation the rear truck of the rail car; Fig. 3 shows in detail a plan of the truck of Fig. 2; Fig. 4 shows an elevation of the truck of Fig. 3 taken on the lines 4—4 of that figure; Fig. 5 shows in elevation the end of the truck of Figs. 3 and 4; Fig. 6 shows in plan view the swiveling axle of the truck shown in Fig. 3; Fig. 7 is a section taken on the lines 7—7 of Fig. 6; and Fig. 8 is a section taken on lines 8—8 of Fig. 6.

Referring now in detail to the drawings wherein like reference characters refer to like parts, reference character 1 indicates the usual motor vehicle chassis having a single rear driving axle 2 with the usual brake drums 3 mounted thereon and connected with the usual braking system (not shown). The driving axle 2, when used on a road vehicle, has mounted thereon rubber tired wheels (not shown). When the motor vehicle chassis is used in a rail car these rubber tired wheels are removed and sprockets 4 are mounted on the axle 2. In the present instance, the sprocket 4 is what is known as a double sprocket, it being understood that a single sprocket may be substituted if desired. The driving axle 2 of the road vehicle is connected to the chassis 1 by means of the usual springs 5 shown in dot-and-dash lines on Fig. 1, which springs are connected to the chassis by the usual spring shackles 6 and the spring in turn is connected to the housing of axle 2 by means of U-bolts 7 in the usual manner.

Beneath the front end of the chassis 1 is mounted a four-wheel truck 8 of conventional design adapted to run on the tracks 9. Beneath the rear end of the chassis 1 is the truck 10 which is connected to the chassis by means of the U-bolts 7 engaging the holes 11 of the spring supports 12 on said truck. The rear truck 10 comprises oppositely disposed rigid side members formed of upper channel shaped members 14ª and lower channel shaped members 14ᵇ having a tie plate 15 secured on the outer faces thereof. The opposite side members are connected by transverse members 16 preferably disposed between the channel shaped members 14ª and 14ᵇ and connected thereto by means of the gusset plates 16ª. Mounted on the upper face of the transverse members 16 are the spring supports 12. These spring supports 12 are spaced transversely of the truck and have mounted thereon bearings 17 engaging the housing of the chassis rear driving axle 2. The driving gears and casing therefor, secured to the rear housing and its enclosed axle, are suspended between spring supports 12. The U-bolts 7 fastening the chassis spring 5 to the housing of axle 2 also serve to rigidly secure the housing of axle 2 to the truck 10 so that the truck and chassis have relative movement in a vertical direction only. At the front end of the truck 10 is an axle 18 having wheels 19 mounted thereon and the axle is journaled in bearings 20 mounted between the members 14 of the truck side members. The axle 18 has end extensions beyond the bearings 20 with sprockets 21 mounted thereon and connected to the sprockets 4 of the chassis axle 2 by means of the chains 22. For the purpose of adjusting the tension in the chain 22 the bearings 20 are mounted in the truck 10 between the members 23 and are slidable longitudinally of the truck between the members 23 by means of adjusting screws 24 mounted in the members 23 and engaging the bearing 20. At the rear end of the truck 10 the members 14 on opposite sides of the truck are connected by the end member 25. Intermediate the member 25 and the adjacent transverse member 16 is mounted a U-shaped member 26 having depending leg portions 27 connected to the side members of the truck.

The rear axle 29 of the truck 10 is of less length than the spacing between the truck side members and has wheels 30 mounted on opposite ends thereof. Mounted on the rear axle 29 is a housing comprising spaced members 31 disposed on opposite sides of the axle and having their lower ends connected to the axle by means of the saddles 32, tie plates 33 and bolts 34. The upper ends of the members 31 are disposed above the axle and connected by means of spaced bearing plates 35 upon which are mounted roller stands 36, each stand containing a roller 37 engaging the bottom flange 26ª of the member 26 to support the truck 10. Intermediate the wheels 30 of the axle 29 and connected to the rear housing by means of the plates 38 and 39 is a tongue 40 extending inwardly of the truck 10. This tongue 40 is connected to one of the transverse members 16 by means of bracket 41 and pin 42. For the purpose of maintaining the axle housing and tongue 40 in normal position relative to the side members of the truck 10, tension members 43 are connected to one of the members 16 of the truck by means of brackets 44 and to the housing member 31 of axle 29 by means of the brackets 45.

From the foregoing it is obvious that the front end of the motor vehicle chassis 1 is supported on a truck 8 engaging the rails 9 and the rear end of the vehicle chassis 1 is supported on a truck 10 having a wheeled front axle 18 engaging the track 9 and a wheeled pivoting axle 29 engaging the track. Mounted on the rear axle 29 is a housing having roller members 37 engaging the transverse member 26 of the truck 10 to support the rear end thereof upon said rear axle. When the rail car is traversing straight portions of the track the rear axle 29 is maintained in normal position beneath the member 26 of the truck and between the side members 14 by means of the tension springs 43. Whenever the rail car is traversing curved portions of the track the rear axle and its attached housing pivots on the pin 42 in the truck 10, at the same time; the rollers 37 of the housing move beneath the web of the member 26 of the truck 10 to provide continuous support for the rear end of the truck. When the rail car moves on to a straight portion of the track the tension members 43 assist in returning the axle 29 to a normal position relative to the truck.

By mounting the rear axle 29 on the truck 10 in the manner described, the frame portion of the truck supporting the front axle 18 and the driving axle 2 of the motor vehicle chassis remains in fixed lateral relation to the chassis 1 of the rail car, maintaining the driving sprockets 4 and 21 in fixed relation laterally of the chassis 1 and at the same time permitting the rear end of the chassis 1 and rear truck 10 to move laterally of the track whilst traversing curves in the track 9.

Having thus described the invention what I claim as new and desire to secure by Letters Patent is:

1. In a rail vehicle comprising an automobile chassis embodying the usual power plant and driven rear axle, and rail trucks under opposite ends of said chassis, the combination in the rear rail truck of a frame including side members disposed beneath said rear axle and secured thereto, chain sprockets on said rear axle, a wheeled axle supporting the front end of said truck frame and journaled thereon, chain sprockets on said truck frame axle, a drive chain connecting said sprockets, a wheeled axle supporting the rear end of said truck frame and connected thereto for radial movement.

2. In a rail vehicle comprising an automobile chassis embodying the usual power plant and driven rear axle, and rail trucks under opposite ends of said chassis, the combination in the rear supporting rail truck of a frame disposed beneath said chassis rear axle, a wheeled axle supporting the front end of said truck frame, chain sprockets on said rear axle and wheeled axle, a drive chain connecting said sprockets, a member disposed transversely of the rear end of said frame and secured thereto, a wheeled axle disposed beneath said member, means on said latter axle engaging said member to support the adjacent end of the frame, and a connection between said latter axle and frame providing radial movement between the axle and frame.

3. In a rail vehicle comprising an automobile chassis having the usual power plant and driven rear axle, and rail trucks under opposite ends of said chassis, the combination in the rear supporting rail truck of spaced side members, means connecting said members intermediate the ends thereof providing a support for said automobile rear axle, a wheeled axle journaled on the truck adjacent the front end of the side members, a wheeled axle of less length than the space between said side members adjacent the rear end of the side members and disposed therebetween, a member disposed transversely of said side members above said latter axle and provided with depending end portions connected to said side members, means on said latter axle engaging said transversely disposed member to support the adjacent end of the side members, and a connection between said latter axle and truck unit providing relative radial movement between the truck unit and axle.

4. In a rail vehicle comprising an automobile chassis having the usual power plant, driven rear axle and rail trucks under opposite ends of said chassis, the combination in the rear supporting truck of a pair of side frame members, means connecting the said members intermediate the ends thereof and providing a support for the automobile rear axle, a wheeled axle connecting the side frame members adjacent the front ends thereof, a wheeled axle of less length than the space between said side members adjacent the opposite ends of the members and disposed therebetween, a member disposed transversely of said side members above said latter named axle and provided with depending end portions connected to said side members, means on said latter axle engaging said transversely disposed member to support the adjacent end of said truck, a tongue connected with said latter named axle and extending inwardly of the truck to a pivotal connection therewith, and resilient means disposed on opposite sides of the tongue and connected with the latter named axle and truck for normally retaining the axle midway between the truck side frame members.

ALFRED C. SCHMOHL.